(12) United States Patent
Christensen (10) Patent No.: US 11,028,965 B2
(45) Date of Patent: Jun. 8, 2021

(54) PORTABLE STABLE TRIPOD FOR PHOTOGRAPHIC EQUIPMENT

(71) Applicant: Savage Universal Corporation, Chandler, AZ (US)

(72) Inventor: Bo Christensen, Nordborg (DK)

(73) Assignee: Savage Universal Corporation, Chandler, AZ (US)

( * ) Notice: Subject to any disclaimer, the term of this patent is extended or adjusted under 35 U.S.C. 154(b) by 0 days.

(21) Appl. No.: 16/272,552

(22) Filed: Feb. 11, 2019

(65) Prior Publication Data

US 2019/0249821 A1 Aug. 15, 2019

Related U.S. Application Data

(60) Provisional application No. 62/629,467, filed on Feb. 12, 2018.

(51) Int. Cl.
| | |
|---|---|
| *F16M 11/38* | (2006.01) |
| *F16M 11/34* | (2006.01) |
| *F16M 11/04* | (2006.01) |
| *G03B 17/56* | (2021.01) |
| *F16M 11/30* | (2006.01) |
| *F16M 11/24* | (2006.01) |

(52) U.S. Cl.
CPC ............. *F16M 11/34* (2013.01); *F16M 11/04* (2013.01); *F16M 11/245* (2013.01); *F16M 11/30* (2013.01); *G03B 17/561* (2013.01); *F16M 2200/027* (2013.01)

(58) Field of Classification Search
CPC ...... F16M 11/34; F16M 11/04; F16M 11/245; F16M 11/30; G03B 17/561

USPC ............... 248/166, 163.1, 440, 177.1, 187.1; 396/419, 428
See application file for complete search history.

(56) References Cited

U.S. PATENT DOCUMENTS

| | | | | |
|---|---|---|---|---|
| 2,646,956 | A * | 7/1953 | Cadwell | F16M 11/245 248/170 |
| 4,215,839 | A * | 8/1980 | Gibran | F16M 11/16 248/170 |
| 4,988,064 | A * | 1/1991 | Hoshino | F16M 11/2057 248/170 |
| 5,072,910 | A * | 12/1991 | May | F16M 11/10 248/412 |
| 7,438,266 | B2 * | 10/2008 | May | G10D 13/28 248/163.1 |
| 7,703,725 | B2 * | 4/2010 | May | F16M 11/245 248/163.1 |
| 7,718,878 | B2 | 5/2010 | May | |
| 8,633,365 | B2 * | 1/2014 | May | G10D 13/02 84/387 A |
| 8,664,500 | B2 * | 3/2014 | Shimada | F16M 11/28 84/421 |

(Continued)

*Primary Examiner* — Todd M Epps
(74) *Attorney, Agent, or Firm* — Sutton Magidoff Barkume LLP (57) ABSTRACT

An improved tripod having enhanced versatility for use preferably as a stand for photographic camera or lighting equipment, wherein the legs are. variable not only with respect. to the length of each other leg. but also with respect to the angle between the legs and the support platform for the photographic equipment, and where one of the legs is independently, longitudinally movable with respect to the other two legs, the other two legs being locked together for longitudinal movement.

14 Claims, 11 Drawing Sheets

(56) References Cited

U.S. PATENT DOCUMENTS

| | | | |
|---|---|---|---|
| 2006/0049319 A1* | 3/2006 | L May | G10G 5/00 248/166 |
| 2006/0086869 A1* | 4/2006 | Hsieh | F16M 11/046 248/171 |
| 2014/0301730 A1* | 10/2014 | Johnson | G03B 17/561 396/428 |

* cited by examiner

PORTABLE STABLE TRIPOD FOR PHOTOGRAPHIC EQUIPMENT

This is an invention directed to an improved tripod having enhanced versatility for use preferably as a stand for photographic camera or lighting equipment, wherein the legs are. variable not only with respect. to the length of each other leg. but also with respect to the angle between the legs and the support platform for the photographic equipment, and where one of the legs is independently, longitudinally movable with respect to the other two legs.

BACKGROUND OF THE INVENTION

Tripods have been available for many, many years. They come in all shapes and sizes, to support instruments of various types, such as cameras, or small telescopes, or lighting for photography; others, generally only the larger sizes, hold surveying instruments, to elevate them to an eye-level position. Tripods, without regard to the instruments they support, usually have a central support plate and three extendable, pivotable legs, that can be shifted into greater length or leveled, or pivoted to varied angles relative to the central column. Usually the center column can be elevated, to bring the platform supporting the instrument up to a reasonable height during usage.

For many years, workers in the field have sought to expand the variability of the positions of the legs relative to the central column, while improving the stability of the— tripods, especially when used on uneven or steep surfaces. while Examples of various types of tripods can be seen in select U.S. patents. Various types of tripods and stands have long been available in the art. Some of the more current ones can be seen, for example, in the U.S. Pat. No. 8,836,508, upon an apparatus and method for securing a portable electronic device. A tripod that includes a case for holding equipment, can be seen in U.S. Pat. No. 8,702,895, disclosing a portable archery target support. Other early patents relating to tripods can be seen in U.S. Pat. No. 366,833, U.S. Pat. Nos. 2,828,097, 2,899,204, a tripod like table with fastening means as shown in U.S. Pat. No. 3,137,522; a tripod supported grill as disclose in U.S. Pat. Nos. 4,120,280; 5,029,765, showing a camera support stand; a target holder having adjustable legs as can be seen in U.S. Pat. No. 5,145,133; and a tripod like frame support as shown in U.S. Pat. No. 7,172,512.

BRIEF SUMMARY OF THE INVENTION

This invention provides a more versatile and improved tripod for the supporting of photographic equipment, most especially lighting equipment and cameras, on both level and on highly uneven or steeply varying surfaces, while providing a stable and secure support for expensive instruments. The improvements of the present invention contemplate constructing and enhancing tripods which are capable of providing stable support over substantially continuous angular relationships between the legs and the central column from being substantially parallel to each other to being substantially perpendicular to each other, or at least up to 85° angle from each other.

These enhancements are provided by having two of the legs preferably locked together so as to be incapable of being separately moved along the central column longitudinally, but being independently capable of being pivoted angularly relative to the third leg, and each leg being independently capable of being longitudinally lengthened or shortened, relative to the other of the locked pair. The third leg is fully independent of the other two, being capable of both independent, longitudinal movement, lengthening, and being pivotally extended over a continuous wide range, independent of the locked pair.

It is, therefore, the principal object of this invention to provide a highly stable and versatile tripod for supporting instruments for which stability is critical, such as photographic or video cameras or photography or videography lighting fixtures.

These and other objects shall become more apparent to those skilled in the art from the verbal description of its preferred embodiments, below, and the attached drawings, herewith.

BRIEF DESCRIPTION OF THE SEVERAL VIEWS OF THE DRAWING

In referring to the drawings:

FIG. 1-A1 depicts a cross-section view along lines A1-A1 of FIG. 1B, including telescoping columns nested within the central polygonal column;

FIG. 1B-1 is a cross-sectional view of the collar supporting the 3 legs of the tripod on the central column, taken along lines B-B of FIG. 1B, including the one independent yoke and two connected yokes supporting the three legs.

FIGS. 1C, 1-C-1, depict two (2) perspective views of the tripod of the present invention, from two different angles, as if in a low position or as if deployed on stairs, where the single unconnected leg is presented at a substantially vertical and shortened position, as it would be if deployed on a higher stair, and the locked together legs are pivoted outwardly and lengthened so as to sit on a lower stair than the single leg, respectively;

DETAILED DESCRIPTION OF THE INVENTION

Figures 1, 1A:
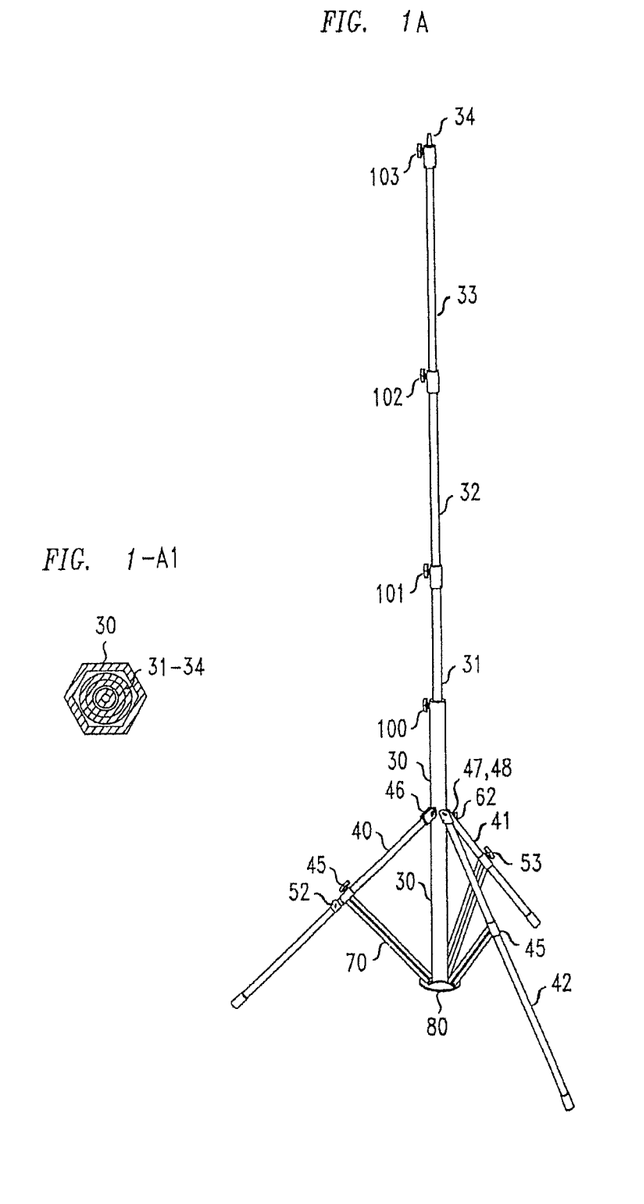
FIG. 1A presents a perspective side view of the tripod of the present invention deployed as it would be on a substantially level surface, but with the central column greatly longitudinally extended.
Figure 1:
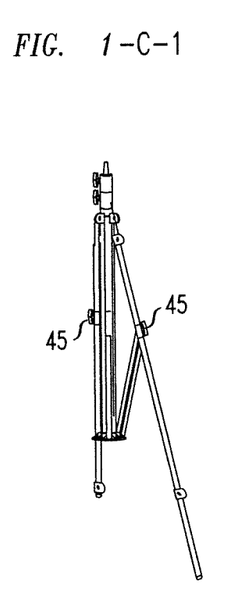
Figures 3, 4:
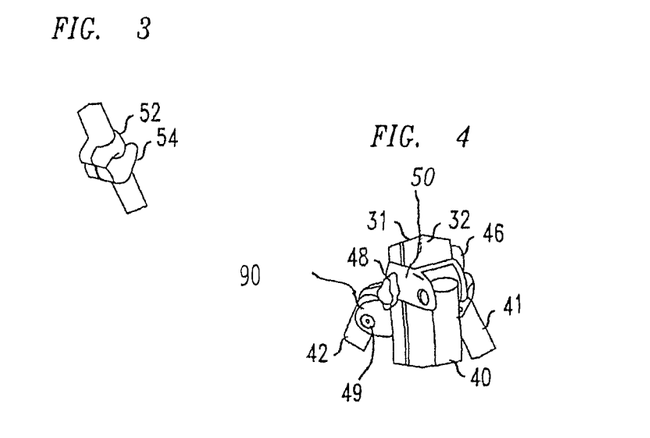
FIG. 3 is a partial perspective view depicting one embodiment of an adjustable leg locking system embodiment including an embodiment of a collet, which opens to allow for telescopic longitudinal extension of the length of each leg, independent of the legs angular position relative to the central column of the tripod, while permitting locking of the collet at a desired longitudinal length for the leg.
FIG. 4 is a partial perspective view depicting the yoke holding an individual leg slidably secure along the central column at various positions permitting the individual leg to move both angularly and longitudinally along the central column. relative to the two locked legs.
Figure 7:
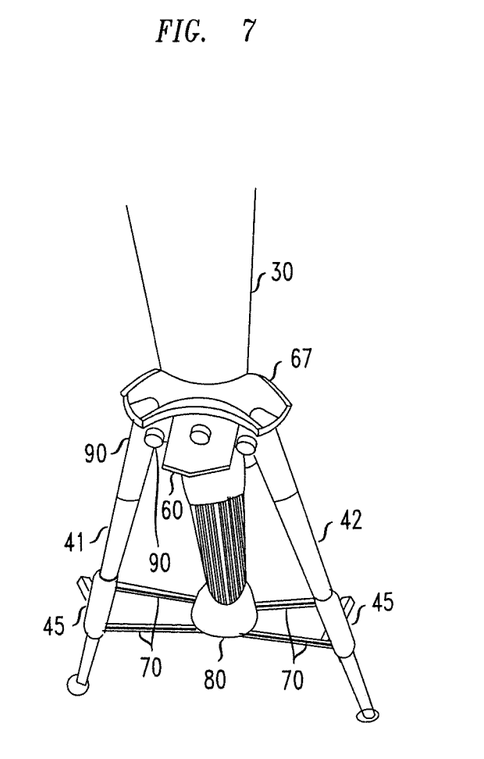
FIG. 7 depicts the locked pair of legs and the yokes to which they are pivotally attached, including the connecting plate joining the yokes, to ensure that the legs move along the central column together so that the legs are both at the same vertical location along the length of the central column for enhanced stability.

In referring to the drawings, and in particular FIG. 1, the tripod includes three legs, 40, 41,42, which are each pivotally joined to the central column, in this case a hexagon; one of the legs 40 is connected wholly independently of the other two legs 41,42, which are locked together (as shown in FIG. 4). The independent, separately movable leg 40 is slidably connected to the central column by its separate colleted yoke 50, which can slide along one of the 6 sides of the hexagonal central column and is held in place on the central column 30 within two channels 31 formed on the central column on either side of the polygon side 32. The pair of locked together legs, 41, 42, are pivotally and slidably connected to the central column by the locked together, colleted yokes 47, 48, including the single connecting member 90 with its collet thumbscrew 62 and clamp face 61, intended to hold the pair of legs at the desired longitudinal level along the central column 30. It should be understood that the collars for the yokes 47, 48, can be formed as 2 separate members joined by a 3rd connection bar (as shown in FIG. 7), or can be formed by molding a single unit (as shown in FIG. 1B-1). Each of the locked legs 41,42 is pivotally joined to their respective locked yokes 47, 48 via a pin 49 extending between the two arms of each yoke and through the legs 41, 42, to secure each of the locked legs 41, 42 to their respective yokes 47, 48.

A series of three or four collets of different sizes 100, 101, 102 and 103, serve to lock the telescopically extended central column portions at the desired extension levels. The telescoping sections found within the main outer central column 30 (which has a polygonal cross-section) may match the shape, e.g., a hexagon, of the main outer central column 30, as shown, or each may be, e.g., cylindrical, as shown in FIG. 1a; the collets 100-103, which lock the telescoping sections in the desired position, are depicted in FIGS. 1 and 1a.

Similarly, the legs 41-42 may each individually be longitudinally extended and locked to a desired length utilizing the collets 42 including a closing and opening handle 44 as depicted in FIG. 3. There are a wide range of different types of locking actions to hold the telescopically extending elements at a desired length, whether it is the extensions of the central column 30 or the extensions of the legs 40-42. Other examples of such collet locking means are described, e.g., in U.S. Pat. Nos. 4,215,839 and 5,222,705 and include both continuously variable extensions as well as extensions that can be locked to discrete lengths in a more affirmative manner.

Figure 5:
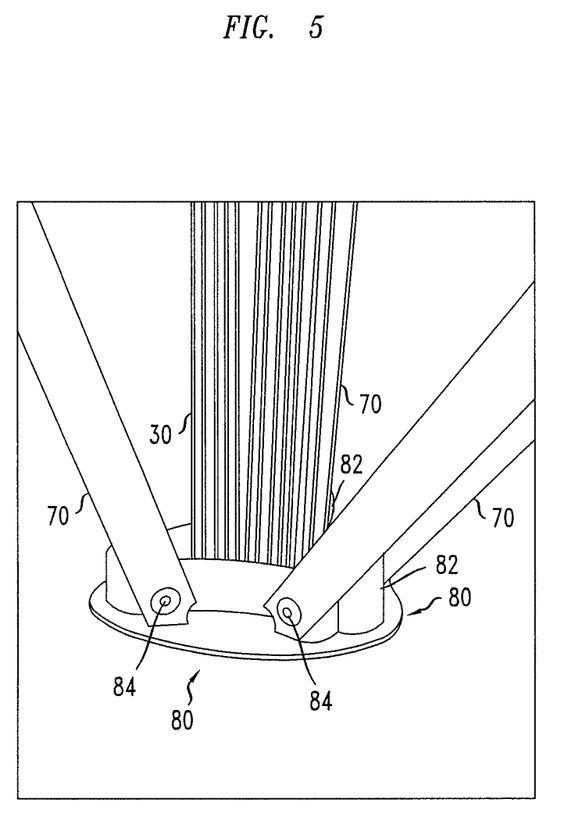
FIG. 5 is a partial perspective view depicting the lower central plate, where the central column is anchored to the central plate, and the lower ends of two pairs of struts, for two of the legs pivotally attached to the outer ends of the raised portions of the central plate, a third raised portion provides for the same connection for a third pair of struts for the third leg, not shown in this view.
Figure 6:
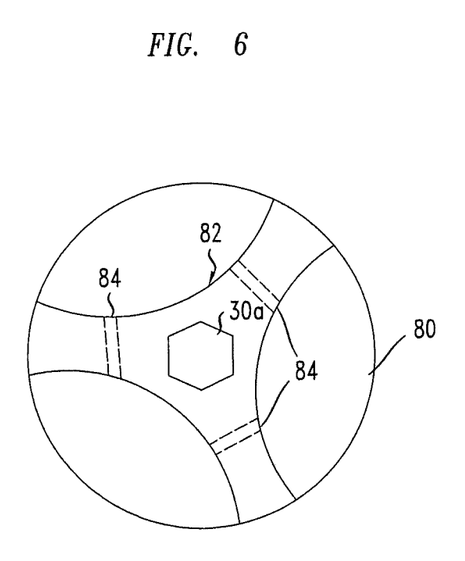
FIG. 6 depicts a top view of the lower plate including the three raised portions, and a central opening into which the polygonal central column is secured and the three channels forming three points of pivotal attachment to the three pairs of the struts.

The central plate 80, as depicted in FIGS. 5, 5a and 6, show how the leg struts 41,42 and 40 at their lower ends are pivotally connected to a raised mounting portion 82 of the central plate 80; the mounting portions 82 is shaped with three arms, each arm 82 including a pivot pin holder 84, also extending through, and locked to, each of the struts 70. In addition, the central column 30 fits within a complementary, e.g., hexagonal opening 35 extending through the center of the three-armed mounting portion 82 on the central plate 80.

Figure 1B:
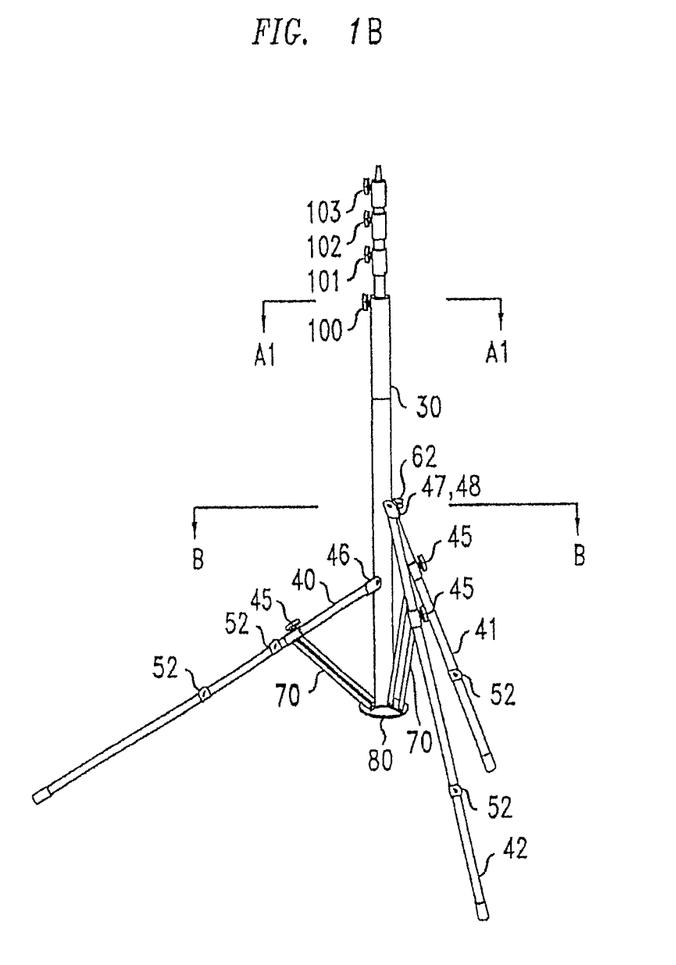
FIG. 1B depicts a perspective view of the tripod of the present invention as if deployed on stairs, where the single unconnected leg is presented at a substantially lengthened position, as it would be if deployed on a lower stair, and the locked together pair of legs are pivoted outwardly and of normal length so as to sit on a higher stair than the single leg.
Figure 1B:
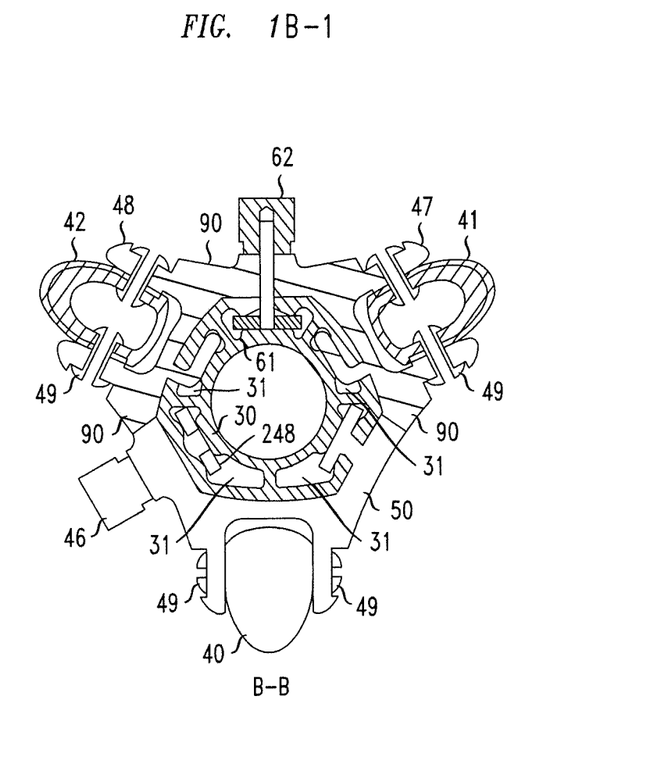
Figure 1C:
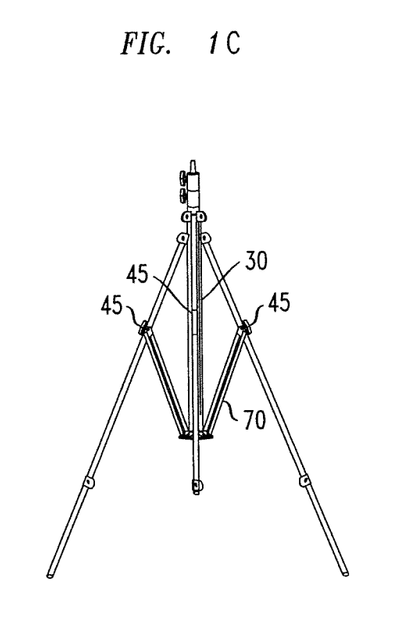
Figure 1D:
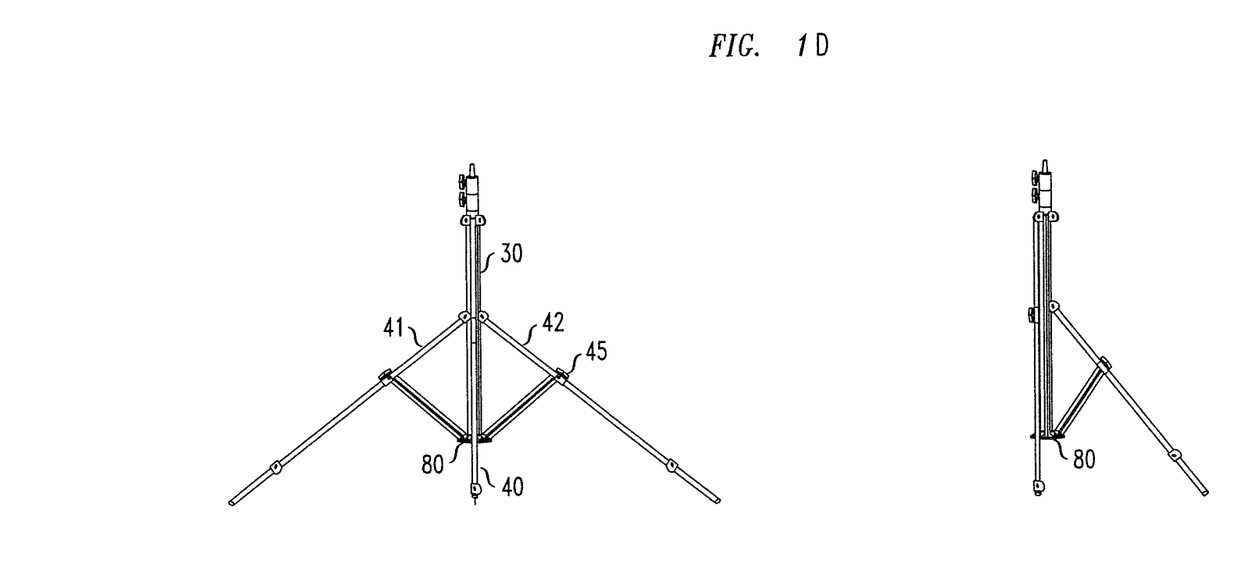
FIG. 1D depict two (2) perspective views of the tripod of the present invention, from several different angles, as if deployed in a corner, where the single rear leg is substantially at the vertical, so that the tripod of the present invention can be located at the corner of, e.g., a room, and the locked pair of legs are pivoted outwardly and lengthened substantially at an equal length for stability purposes.
Figure 1E:
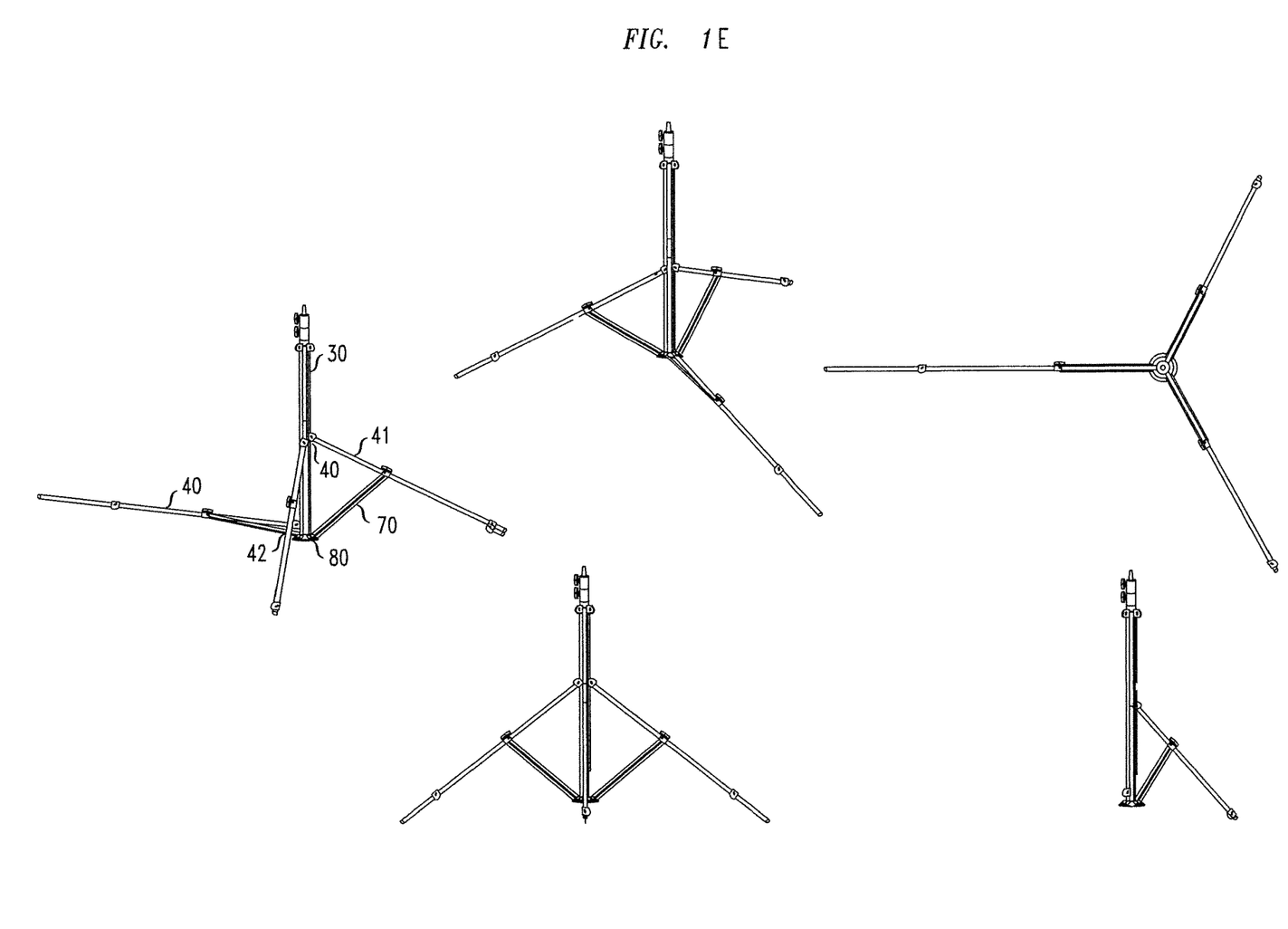
FIG. 1E depict four (4) perspective views of the tripod of the present invention, from several different angles, where the single leg is lowered substantially to the bottommost position of the track along the central column to allow the single leg to slide under obstacles, such as an automobile, in order to allow the tripod to be placed in a variety of locations.
Figure 1F:
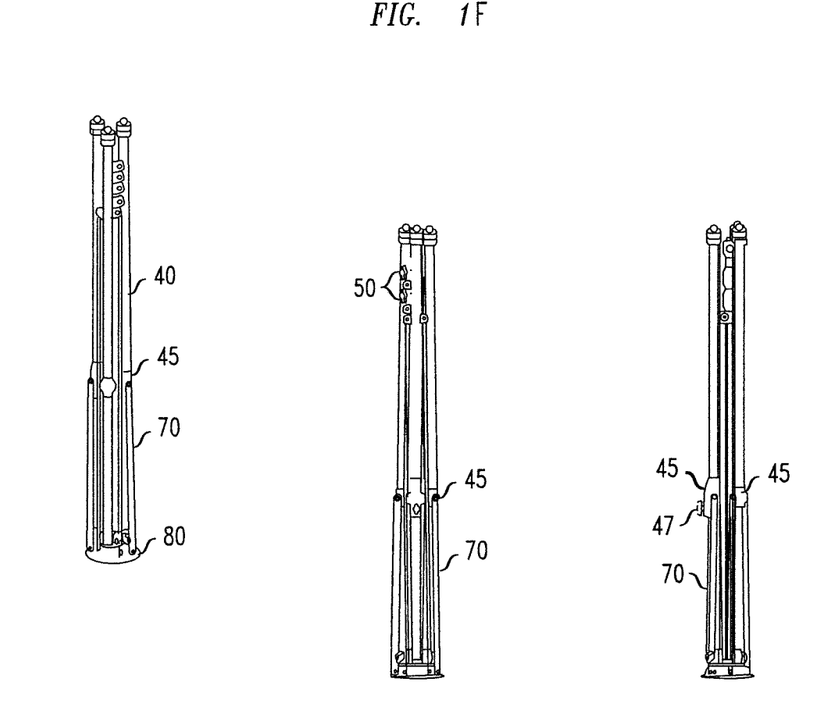
FIG. 1F depict three (3) perspective views of the tripod of the present invention, from several different angles, as if deployed in a fully folded position for storage or transportation.
Figure 2:
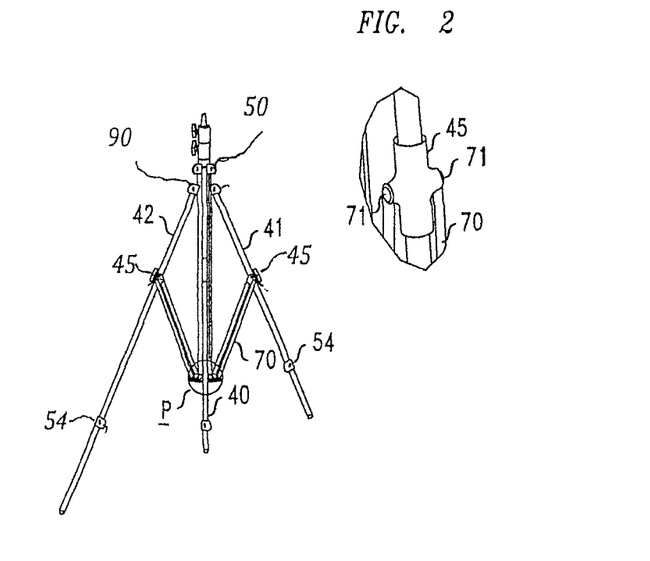
FIG. 2 depicts a partial perspective view of the portion of the leg of the tripod of the present invention, including the sliding joint pivotally connecting the tripod leg to a pair of struts that allows for longitudinal movement of the struts along the leg, and allows for the pivotal movement of the struts relative to the legs and of the legs relative to the lower central plate of the central column.

The advantage of the present invention is shown by the many positions the legs 40-42 can stably maintain as shown in the several drawings of FIGS. 1 through 1f; these leg positions range from a fully folded position where the legs are folded into a wholly upward position, where the sliding strut holders 45 are located vertically above the central plate 80, the legs 40-42 extending substantially parallel to the central column 30. The central column is moved into its lowermost un-extended position (FIG. 1B) such that the several collets 100-103 are adjacent each other immediately above the outer central column 30. The legs can otherwise move from a position where the independent single leg 40 is substantially 90° extended from the central column 30 (FIG. 1E) to one where only the independent single leg is folded flat against the central column 30 but extending below the central plate 80, as in FIG. 1d. These varying configurations are achieved by providing for the independent extension of each of the legs and the slide motion of each of the struts 70 along the entire length of its respective leg 40-42 by virtue of the struts being slidably connected to each leg by a slide collar 45 surrounding the outer surface of each of the legs 40-42. The channels 31 provided along the faces of the main central column 30, are utilized for slidably connecting the leg yokes 47, 48, 50 to the central column 30. The particular configurations of the various connections between the struts, the central plate, and the central column are all necessary to achieve the broad range of movement, together with the enhanced stability provided, by locking two of the legs 41,42 together so that they are both maintained at the same level along the central column.

Many different variations of the joints between the legs and the struts, for providing for the elongation or shortening of the legs, the elongation or shortening of the central column and the locking of such telescoping sections are possible without losing the advantages of the present invention.

The scope of the present invention is defined by the claims set forth below, the various modifications and alternative designs for the collet locking means, the yokes and the slide can be made without moving outside scope of the present invention the specific embodiments described herein are not intended to limit the scope of the invention but are described as exemplary of the full scope of the invention, that scope being defined by the following claims.

The following invention is claimed:

1. A tripod comprising a longitudinally extending central column, the central column having a central axis, a first end and a second end, a central plate rigidly and immovably secured to the second end of the central column and having a surface extending outwardly from, and transversely to, the axis of the central column; and further comprising:
   three yokes longitudinally movably secured to the central column;
   three legs, each pivotally secured to one of the longitudinally movable yokes, being longitudinally, telescopically extendable outwardly from the yoke on the central column;
   a longitudinal lock on each leg to lock each leg separately at a plurality of longitudinal positions;
   three struts, each strut having two ends, and being pivotally secured at one end to the central plate; and
   three collars, each collar surrounding and being longitudinally slidably movable along one of the legs, the second end of each strut being pivotally movably secured to one of the collars;
   whereby the tripod is capable of stably supporting photographic equipment on the central column when the legs are resting on a level surface or at longitudinally different horizontal levels or on uneven surfaces.

2. The tripod of claim 1, wherein the yokes for two of the three legs are rigidly connected to each other at a position adjacent the central column.

3. The tripod of claim 1, further comprising a clamp secured to the first end of the central column, and a securing mechanism secured to the clamp and removably attachable to photographic equipment or lighting equipment.

4. The tripod of claim 1, wherein each of the struts comprises a pair of struts pivotally connected to a leg and pivotally connected to the central plate.

5. The tripod of claim 4, further comprising a lockable, slidable collar secured around and slidable along each leg of the tripod, the lower end of the central column being centrally connected to the transverse surface of the central plate, and the central plate having three raised surfaces each extending transversely outwardly from the central column.

6. The tripod of claim 5, wherein each pair of struts is pivotally connected at one end to the lockable, slidable collar on one of the legs and at the second end to one of the raised surfaces on the central plate.

7. The tripod of claim 6, further comprising pivot means through each raised surface extending outwardly from the central column and wherein one of each pair of struts is pivotally connected at one end to the collar on each of the three legs and the second end of each pair of struts being pivotally connected to one of the raised portions of the lower central plate.

8. The tripod of claim 5, wherein the central column is polygonal in cross-section, and the central column further comprises channels inset into each side of the polygonal central column, and extending longitudinally along the central column, wherein each of the yokes is pivotally connected to a leg of the tripod and is supported from the channels.

9. The tripod of claim 1 wherein the central column is polygonal in cross-section, and further comprising telescoping sections supported within the polygonal central column and extendable upwardly therefrom.

10. The tripod of claim 9 wherein the telescoping sections are extendable to several times the length of the central polygonal column and are lockable at predetermined lengths.

11. The tripod of claim 10, wherein the polygonal central column is formed from a metal.

12. The tripod of claim 11 wherein the metal is selected from the group consisting of aluminum, magnesium, iron and alloys thereof.

13. The tripod of claim 12 wherein the telescoping sections are formed of carbon fibers.

14. A tripod having a longitudinally extending central column, the central column having a central axis, a first end and a second end, with channels extending between the two ends along the central column, a central plate rigidly, longitudinally immovably, secured to the second end of the central column;
   longitudinally movable yokes movably secured in the channels, and three legs, each leg having a first end and a second end, and being pivotally secured at the first end to one of the longitudinally movable yokes secured to the central column;
   a collar on each leg, each such collar being longitudinally movably secured around, and movable along the leg; each leg also being longitudinally, telescopically extending from the collar; and having locking means on each leg to lock each leg separately at a plurality of longitudinally extending positions; three struts, each strut being pivotally secured at one end to the central plate and pivotally secured at a second end to the collar on one of the three legs;
   whereby the tripod is capable of stably supporting photographic equipment on the central column when the legs are resting on a level surface or a longitudinally different horizontal levels or on uneven surfaces.

* * * * *